(12) United States Patent
Shachrai

(10) Patent No.: US 10,324,980 B2
(45) Date of Patent: Jun. 18, 2019

(54) METHOD AND SYSTEM FOR CACHING OF VIDEO FILES

(71) Applicant: Eyal Shachrai, Tel Mond (IL)

(72) Inventor: Eyal Shachrai, Tel Mond (IL)

( * ) Notice: Subject to any disclaimer, the term of this patent is extended or adjusted under 35 U.S.C. 154(b) by 153 days.

(21) Appl. No.: 15/302,167

(22) PCT Filed: Apr. 2, 2015

(86) PCT No.: PCT/IL2015/050368
§ 371 (c)(1),
(2) Date: Oct. 6, 2016

(87) PCT Pub. No.: WO2015/155768
PCT Pub. Date: Oct. 15, 2015

(65) Prior Publication Data
US 2017/0031930 A1 Feb. 2, 2017

Related U.S. Application Data

(60) Provisional application No. 61/975,922, filed on Apr. 7, 2014.

(51) Int. Cl.
| | |
|---|---|
| G06F 13/00 | (2006.01) |
| G06F 16/00 | (2019.01) |
| G06F 16/78 | (2019.01) |
| G06F 16/95 | (2019.01) |
| H04L 29/08 | (2006.01) |

(Continued)

(52) U.S. Cl.
CPC .......... *G06F 16/7867* (2019.01); *G06F 13/00* (2013.01); *G06F 16/00* (2019.01);
(Continued)

(58) Field of Classification Search
CPC ... H04L 67/06; H04L 67/146; H04N 21/2183; H04N 21/6125; H04N 21/6175; G06F 17/3082; G06F 17/30861
(Continued)

(56) References Cited

U.S. PATENT DOCUMENTS

| | | |
|---|---|---|
| 7,770,198 B1 | 8/2010 | Greene |
| 2007/0109153 A1* | 5/2007 | Ma ...................... H03M 7/3086 341/50 |

(Continued)

FOREIGN PATENT DOCUMENTS

WO 2015/155768 A1 10/2015

OTHER PUBLICATIONS

International Search Report for PCT/IL2015/050368, dated Jul. 29, 2015.

(Continued)

*Primary Examiner* — El Hadji M Sall

(57) ABSTRACT

A system and method for the caching of files streaming from at least one source-server towards at least one end-user via the internet; system characterized by at least one integrated circuit (IC) configured to manage and direct files to be cached in at least one storage-element, said ICs and storage elements interconnected by at least one high speed bus. The storage elements comprise different types of non-volatile memory, each characterized by its access speed. A protocol selects files and file fragments for caching. At least one database maintains data on each cached file or file fragment, the data comprising: caching status, data format characteristics, and relative end-user demand. A protocol continuously allocates or reallocates memory for the caching of the files and file fragments, from among the storage elements, as a function of the database data and respective amounts of memory available in the storage elements.

20 Claims, 7 Drawing Sheets

(51) Int. Cl.
*H04N 21/61* (2011.01)
*H04N 21/222* (2011.01)
*H04N 21/231* (2011.01)
*H04N 21/845* (2011.01)
*H04N 21/854* (2011.01)
*H04N 21/2183* (2011.01)

(52) U.S. Cl.
CPC .............. *G06F 16/95* (2019.01); *H04L 67/06* (2013.01); *H04L 67/146* (2013.01); *H04N 21/2183* (2013.01); *H04N 21/222* (2013.01); *H04N 21/23103* (2013.01); *H04N 21/23106* (2013.01); *H04N 21/6125* (2013.01); *H04N 21/6175* (2013.01); *H04N 21/85406* (2013.01); *H04N 21/8456* (2013.01)

(58) Field of Classification Search
USPC .......................... 709/216, 200, 231, 203, 223
See application file for complete search history.

(56) References Cited

U.S. PATENT DOCUMENTS

| | | | |
|---|---|---|---|
| 2009/0178053 A1* | 7/2009 | Archer | G06F 9/5072 718/105 |
| 2010/0274768 A1* | 10/2010 | Wang | G06F 17/30575 707/676 |
| 2013/0166625 A1 | 6/2013 | Swaminathan et al. | |
| 2013/0212208 A1 | 8/2013 | Harvell et al. | |

OTHER PUBLICATIONS

Written Opinion of the International Search Authority for PCT/IL2015/050368, dated Jul. 29, 2015.
International Preliminary Report on Patentability for PCT/IL2015/050368, dated Sep. 11, 2016.

* cited by examiner

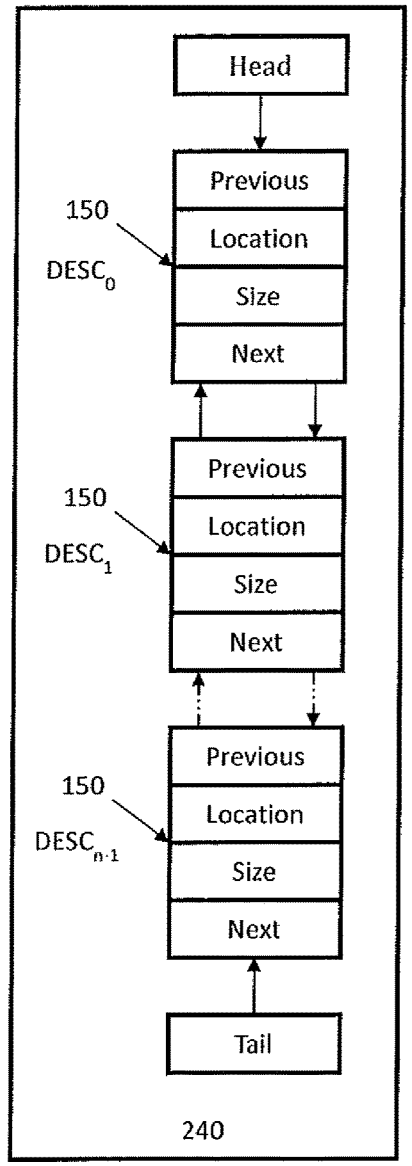
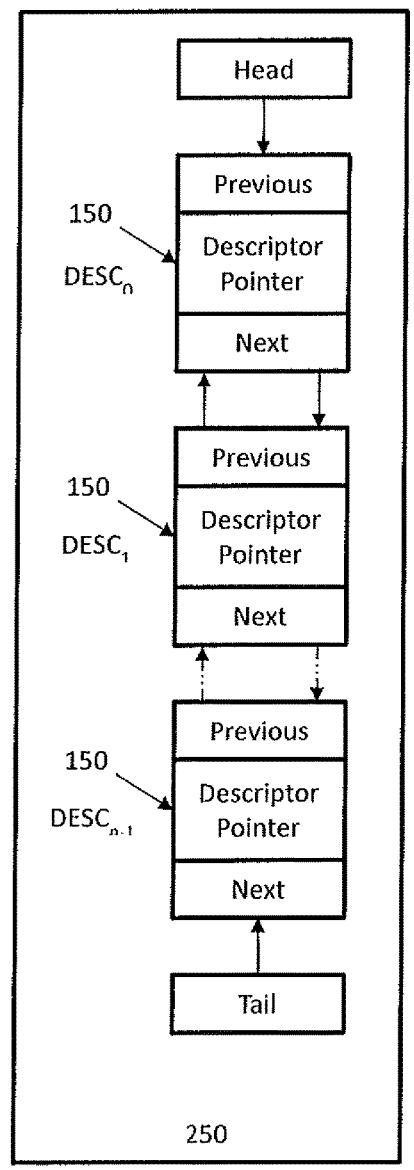
Figure 4
Figure 5

METHOD AND SYSTEM FOR CACHING OF VIDEO FILES

CROSS-REFERENCE TO RELATED APPLICATIONS

This application is a U.S. National Phase filing under 35 U.S.C. 371 of International (PCT) Patent Application No. PCT/IL2015/050368, filed 2 Apr. 2015, which claims priority from U.S. Provisional Patent Application No. 61/975,922, filed 7 Apr. 2014, all of which are incorporated by reference in their entirety.

BACKGROUND OF THE INVENTION

Video distribution to end users over the internet is gaining momentum. Most peak-hour internet traffic is used for video content delivery. Internet video streaming sites and services, such as Netflix™, Hulu and YouTube™, are very popular. This video traffic adds a very high burden on the network infrastructure, to a point where the network is congested and the Quality of Experience (QoE) to the user is degraded.

One solution for lowering the load on the internet, and thereby reducing network congestion, is the caching of video data. The most popular titles viewed by users are cached and replayed on demand. The recommended location of the cache is as close as possible to the end user, in order to minimize the transmission distance of the content from the source server.

Commercial media caches are usually implemented on standard computing servers by software applications running on processors, such as Intel x86 architecture-based. The media files are usually stored as-is on standard storage devices and accessed on request to retrieve the entire file. This implementation suffers from performance limitations which are the result of computing overhead, required for abstraction of the hardware for the programmer. Such an overhead is added, for example, by an operating system layer.

Cached files are stored on one main storage device or an array of devices. Memory devices can be categorized according to their access speed and the cost per bit. There are memory elements, such as the embedded on-chip flip-flop circuits, which are highly accessible but with very high cost per bit. Other existing memory elements, from the high-access-speed/high-cost to the slow-access-speed/low-cost are: embedded SRAM, external SDRAM devices (such as DDR), NAND Flash, PCIe NAND Flash, solid state drives (SSDs) and Hard Disk Drives (HDDs). In existing computer servers, main storage memory is usually implemented with a single HDD or an array of HDDs.

In the field of video compression, a video frame is compressed using different algorithms, each having different advantages and disadvantages related to degrees of data compression, accuracy, and processing requirements. These different algorithms for video frames are called picture types or frame types. The three major picture types used in the different video algorithms are I, P and B. I-frames, Intra coded pictures, are the least compressible but don't require other video frames to decode; P-frames, Predicted pictures, can use data from previous frames to decompress and are more compressible than I-frames; and B-frames, Bi-directionally predicted pictures, can use both previous and forward frames for data reference to get the highest amount of data compression.

Greene U.S. Ser. No. 07/770,198B discloses techniques for detection of repeated video content to reduce an amount of high bandwidth traffic transmitted across a network from a video source device to remote subscriber devices. In particular, Greene's invention relates to a first intermediate device capable of recognizing patterns of video content and sending a communication to a second intermediate device that transmits a cached version of the video content. In this way, the first intermediate device does not have to resend the raw, high-bandwidth consuming video content over the network. The network may comprise elements of any private or public network.

The aforementioned technologies are part of a trend to respond to ever-increasing demands for the communication of video data across far-flung networks. More recently, real-time internet streaming has become a venue of choice for consumers of high-definition (HD) video information, which can quadruple or increase by a factor of 10 the volume of video data to be transmitted.

Therefore, there is a long-felt and unmet need for a system that would ease the burden on the network infrastructure by managing and directing cached files.

SUMMARY OF THE INVENTION

It is thus one object of the present invention to disclose a system [100] configured for the caching of files [110] streaming from at least one source-server to at least one end-user via the internet;
characterized by at least one integrated circuit (IC) [300], configured to manage and direct the files [110] or file fragments [120] to be cached in at least one storage-element [200], the ICs and storage elements interconnected by at least one high speed bus [210];
further wherein the storage elements [200] comprise different types of non-volatile memory, each type characterized by its memory access speed range;
further wherein a predetermined protocol resides in at least one storage element [200] and implements the selection of files [110] and file fragments [120] for caching;
further wherein the system [100] comprises at least one database [230] that maintains data on each cached file [110] or file fragment [120], the data a group of variables comprising: the caching status of files [110] and file fragments [120], data format characteristics of the files [110] and file fragments [120], and relative end-user demand for the files [110] and file fragments [120];
further wherein a predetermined protocol resides in at least one storage element [200] and continuously allocates or reallocates memory for the caching of the files [110] and file fragments [120] from among the storage elements [200]; the protocol allocating the memory as a function of the data maintained in the database [230] and respective amounts of the memory available in the storage elements [200].

It is another object of the present invention to disclose the system mentioned above, wherein the IC [300] is selected from a group of logic circuit families comprising: field-programmable gate array (FPGA), hybrid CPU/FPGA, application-specific integrated circuit (ASIC), a multi-core processor, and any combination thereof.

It is another object of the present invention to disclose the system mentioned above, wherein communication between the IC [300] and at least one storage-element [200], is implemented by at least one Peripheral Component Interconnect Express (PCIe) bus [400].

It is another object of the present invention to disclose the system mentioned above, wherein data communication between the IC [300] and at least one storage-element [200]

is directed according to the IC [300] instruction via at least one CPU [221] and/or at least one PCIe switch [222].

It is another object of the present invention to disclose the system mentioned above, wherein the IC [300] is configured for segmentation of at least one of the files [110] into at least two autonomous fragments [120]; further wherein the IC [300] is configured to cache at least two fragments [120] in at least one of the storage elements [200].

It is another object of the present invention to disclose the system mentioned above, wherein at least one storage-element [200] is selected from a group comprising: embedded registers, on-board Nand-flash, PCIe NAND flash card, on-chip flip-flop, embedded SRAM, on-board SRAM, on-board DRAM, external DRAM, solid state drives (SSDs), hard disk drives (HDDs), external storage and any combination thereof.

It is another object of the present invention to disclose the system mentioned above, wherein the system comprises at least two storage-elements [200] and the IC [300] is configured for real-time selection and storage of the files [110] and/or file fragments [120] in at least one of the at least two storage-elements [200] for the caching.

It is another object of the present invention to disclose the system mentioned above, wherein the IC [300] is configured to:
 a. search for the files [110] and/or file fragments [120] in real time within at least one storage-element [200];
  in the event the files [110] and/or file fragments [120] are found in at least one storage-element [200], the IC [300] is configured to:
   i. retrieve the files [110] and/or file fragments [120] from the at least one storage-element [200]; and
   ii. terminate the downloading of the files [110] and/or file fragments [120] from the source-server;
  otherwise, the IC [300] is configured to:
   i. select at least one storage-element [200]; and
   ii. download the files [110] and/or file fragments [120] from the source-server and cache the files [110] and/or file fragments [120] in the selected storage-element [200];
  thereby controlling the caching of the files [110] and/or file fragments [120] in at least one storage-element [200]; and
 b. forward the files [100] and/or file fragments [120] towards the end-user.

It is another object of the present invention to disclose the system mentioned above, wherein the real-time selection is according to at least one feature selected from a group consisting of:
 a. the read/write speed of each storage-element [200],
 b. the cost-per-bit of each storage-element [200],
 c. the activity rate of the file [110] of the fragments [120],
 d. the compression methods of the file [110] or the file fragment [120], and
 e. any combination thereof.

It is another object of the present invention to disclose the system mentioned above, wherein the format of the files [110] and/or file fragments [120] is verified.

It is another object of the present invention to disclose the system mentioned above, wherein the IC [300] configured for high speed Ethernet communication with external devices.

It is another object of the present invention to disclose the system mentioned above, wherein the IC [300] is configured for inspecting and classifying the files [110] by means of Deep Packet Inspection (DPI) of the streaming traffic.

It is another object of the present invention to disclose the system mentioned above, wherein at least one storage-element [200] is linked to at least one database [230], with the database configured to identify and track the files [110] and/or file fragments [120].

It is another object of the present invention to disclose the system mentioned above, wherein the IC [300] is configured to manage at least one database [230].

It is another object of the present invention to disclose the system mentioned above, wherein the IC [300] is configured to:
 a. construct at least one timeline-list [240] for at least two file fragments [120]; and
 b. store the timeline-list [240] in the at least one database [230].

It is another object of the present invention to disclose the system mentioned above, wherein
 a. each file fragment [120] is associated with a timeline-node [140] of data comprising:
  i. a pointer to the next timeline-node or to the head of the timeline-list [240],
  ii. a pointer to the previous timeline-node,
  iii. a pointer to the location of the file fragment [120], and
  iv. the size of the file fragment [120]; and
 b. timeline-nodes [140] are listed on the timeline-list according to the timeline sequence of their associated file fragments [120].

It is another object of the present invention to disclose the system mentioned above, wherein the IC [300] configured to:
 a. construct at least one activity-rate list [250] for at least two file fragments [120]; and
 b. store the activity-rate list [250] in at least one database [230].

It is another object of the present invention to disclose the system mentioned above, wherein each of the fragments [120] is associated with a different activity-node [150] of data comprising:
 a. a pointer to the next activity-node or to the head of the activity-rate list [250],
 b. a pointer to the previous activity-node, and
 c. a pointer to the location of the file fragment [120].

It is another object of the present invention to disclose the system mentioned above, wherein the IC [300] is configured to
 a. rank at least two storage-elements [200] according to their access speed levels;
 b. store the file fragments [120] according to their relative activity rates, with the most active fragment stored in the highest ranked storage-element [200]; and
 c. list the activity-nodes of the file fragments in the activity-rate list [250] accordingly.

It is another object of the present invention to disclose the system mentioned above, wherein the IC [300] is configured to migrate at least one of the fragments [120] from one of at least two storage-elements [200] to another, the migration a function of:
 a. updated changes in the available memory in the storage-elements [200] and
 b. updated changes in the activity-rate list [250].

It is another object of the present invention to disclose the system mentioned above, wherein the file [110] or file fragment [120] contains data belonging to one of a group of data file categories comprising: video-film, on-line gaming, web application, website, navigation tool application, tracking tool application, and any combination thereof.

It is another object of the present invention to disclose the system mentioned above, wherein the IC [300] is further configured to construct and update at least one pointing-entry [270] to the timeline-node [140] associated with the next file fragment [120] to be transmitted to the end-user, according to the timeline list [240].

It is another object of the present invention to disclose the system mentioned above, wherein the pointing-entry [270] data comprises: a file ID value for the fragment's [120] file, a pointer to the timeline-node [140], the file's source-server IP address (SIP), the end-user's IP address (DIP), the source-server's port number (SPN), and the end-user's port number (DPN).

It is another object of the present invention to disclose the system mentioned above, wherein the pointing-entry [270] data comprises: the file ID, a pointer to the timeline-node [140], the file's source-server IP address (SIP), and the end-user's IP address (DIP).

It is another object of the present invention to disclose the system mentioned above, wherein the system is configured to cache at least two files [110] having similar content and respectively encoded for streaming at different bit-rates; wherein the files can be used for Adaptive Bit-Rate (ABR) streaming of the content over a network.

It is another object of the present invention to disclose the system mentioned above, wherein timeline-node [140] data further comprises: a content identification key used for comparison with the searched fragment, a pointer to a similar fragment encoded for a higher available bit-rate [120], and a pointer to a similar fragment encoded for a lower available bit-rate [120], thereby ABR streaming of the file is facilitated in a network with dynamically changing bandwidth and bit-rate conditions.

It is another object of the present invention to disclose the system mentioned above, wherein the system [100] is configured to facilitate an external entity [500] to select and provide the files [110] and/or file fragments [120] to be cached by the system [100].

It is another object of the present invention to disclose a method for the caching of files [110] streaming from at least one source-server to at least one end-user via the internet, the method comprising steps of providing at least one integrated circuit (IC) [300], configured to manage and direct the files [110] or file fragments [120] to be cached in at least one provided storage-element [200], the ICs and storage elements interconnected by at least one provided high speed bus [210];
the method further comprising steps of providing storage elements [200] having different types of non-volatile memory, each type characterized by its memory access speed range;
the method further comprising steps of selecting files [110] and file fragments [120] for caching according to a predetermined protocol residing in at least one storage element [200];
the method further comprising steps of providing at least one database [230] that maintains data on each cached file [110] or file fragment [120], the data a group of variables comprising: the caching status of files [110] and file fragments [120], data format characteristics of the files [110] and file fragments [120], and relative end-user demand for the files [110] and file fragments [120];
the method further comprising steps of continuously allocating or reallocating memory for the caching of the files [110] and file fragments [120] from among the storage elements [200] according to a predetermined protocol residing in at least one storage element [200]; the protocol allocating the memory as a function of the data maintained in the database [230] and respective amounts of the memory available in the storage elements [200].

It is another object of the present invention to disclose the method mentioned above, further comprising steps of selecting the IC [300] from a group of logic circuit families comprising: field-programmable gate array (FPGA), hybrid CPU/FPGA, application-specific integrated circuit (ASIC), multi-core processor, and any combination thereof.

It is another object of the present invention to disclose the method mentioned above, further comprising steps of implementing communication between the IC [300] and at least one storage-element [200] by means of at least one PCIe bus [400].

It is another object of the present invention to disclose the method mentioned above, further comprising steps of directing the files [110] and/or file fragments [120] from the IC [300] to at least one storage-element [200] via at least one CPU [221] and/or at least one PCIe switch [222].

It is another object of the present invention to disclose the method mentioned above, further comprising the steps of segmenting at least one of the files [110] to at least two autonomous fragments [120] and caching the autonomous fragments [120] in at least one of the storage elements [200].

It is another object of the present invention to disclose the method mentioned above, further comprising steps of selecting at least one storage-element [200] from a group consisting of: embedded registers, on-board NAND-flash, PCIe NAND flash card, on-chip flip-flop, embedded SRAM, on-board SRAM, on-board DRAM, external DRAM, solid state drives (SSDs), hard disk drives (HDDs), external storage, and any combination thereof.

It is another object of the present invention to disclose the method mentioned above, further comprising the steps of providing at least two storage-elements [200] and configuring the IC [300] for selecting and storing the files[110] and/or file fragments [120] in at least one of the storage elements [200] for caching.

It is another object of the present invention to disclose the method mentioned above, further comprising steps of configuring the IC [300] for:
a. real-time searching for the files [110] and/or file fragments [120] within at least one storage-element [200];
  in the event the files [110] and/or file fragments [120] are found in at least one storage-element [200], the method comprises steps of:
    i. real-time retrieval of the files [110] and/or file fragments [120] from at least one storage-element [200]; and
    ii. real-time termination of the downloading of the files [110] and/or file fragments [120] from the source-server;
  otherwise, the method comprises steps of:
    i. selecting at least one of at least one storage-element [200];
    ii. caching the files [110] and/or file fragments [120] in at least one storage-element [200];
  thereby controlling the caching of the files [110] and/or file fragments [120] in at least one storage-element [200]; and
b. forwarding the files [110] and/or file fragments [120] towards the end-user.

It is another object of the present invention to disclose the method mentioned above, further comprising steps of verifying the format of the files [110] and/or file fragments [120].

It is another object of the present invention to disclose the method mentioned above, further comprising steps of selecting the storage elements according to at least one feature selected from a group consisting of:
   a. the read/write speed of each storage-element [200],
   b. the cost-per-bit of each storage-element [200],
   c. the activity rate of the file [110] or of the file composed in part of the file fragment [120],
   d. the compression methods of the file [110] or file fragment [120], and
   e. any combination thereof.

It is another object of the present invention to disclose the method mentioned above, further comprising steps of configuring IC [300] for high speed Ethernet communication with external devices.

It is another object of the present invention to disclose the method mentioned above, further comprising steps of inspecting and classifying the files [110] by means of Deep Packet Inspection (DPI) of the streaming traffic.

It is another object of the present invention to disclose the method mentioned above, further comprising steps of providing at least one storage element [200] linked to at least one database [230], with the database configured for identifying and tracking the files [110] and/or file fragments [120].

It is another object of the present invention to disclose the method mentioned above, further comprising steps of configuring the IC [300] for managing at least one database [230].

It is another object of the present invention to disclose the method mentioned above, further comprising steps of:
   a. constructing at least one timeline-list [240] for at least two file fragments [120]; and
   b. storing the timeline-list [240] in at least one database [230].

It is another object of the present invention to disclose the method mentioned above, further comprising steps of:
   a. associating each file fragment [120] with a timeline-node [140] of data comprising:
      i. a pointer to the next timeline-node or to the head of the timeline-list [240],
      ii. a pointer to the previous timeline-node,
      iii. a pointer to the location of the file fragment [120], and
      iv. the size of the file fragment [120]; and
   b. listing the timeline-nodes [140] on the timeline-list according to the timeline sequence of their associated file fragments [120].

It is another object of the present invention to disclose the method mentioned above, further comprising steps of:
   a. constructing at least one activity-rate list [250] for at least two file fragments [120]; and
   b. storing the activity-rate list [250] in at least one database [230].

It is another object of the present invention to disclose the method mentioned above, further comprising steps of associating each file fragment [120] with an activity-node [150] of data comprising:
   a. a pointer to the next activity-node or to the head of the activity-rate list [250],
   b. a pointer to the previous activity-node, and
   c. a pointer to the location of the file fragment [120].

It is another object of the present invention to disclose the method mentioned above, further comprising steps of:
   a. ranking at least two storage-elements [200] in a hierarchy according to their access speed levels;
   b. storing file fragments [120] according to their relative activity rates, with the most active fragment stored in the highest ranked storage-element [200]; and
   c. listing the activity-nodes of the file fragments in the activity-rate list [250] accordingly.

It is another object of the present invention to disclose the method mentioned above, further comprising steps of migrating at least one of the fragments [120] from one of at least two storage-elements [200] to another, the migration a function of:
   a. updated changes in the available memory in the storage-elements [200] and
   b. updated changes in the activity-rate list [250].

It is another object of the present invention to disclose the method mentioned above, further comprising steps of selecting files [110] from a group of data file categories comprising: video-film, on-line gaming, web application, website, navigation tool application, tracking tool application, and any combination thereof.

It is another object of the present invention to disclose the method mentioned above, further comprising steps of configuring the IC [300] to construct and update at least one pointing-entry [270] to the timeline-node [140] associated with the next file fragment [120] to be transmitted to the end-user, according to the timeline list [240].

It is another object of the present invention to disclose the method mentioned above, further comprising steps of configuring the pointing-entry [270] data to comprise: a file ID value for the fragment's [120] file, a pointer to the timeline-node [140], the file's source-server IP address (SIP), and the end-user's IP address (DIP).

It is another object of the present invention to disclose the method mentioned above, further comprising steps of configuring the pointing-entry [270] data to further comprise: the source-server's port number (SPN), and the end-user's port number (DPN).

It is another object of the present invention to disclose the method mentioned above, further comprising steps of configuring said pointing-entry [270] data to comprise: the source-server's port number (SPN), and the end-user's port number (DPN).

It is another object of the present invention to disclose the method mentioned above, further comprising steps of caching at least two files [110] having similar content and respectively encoded for streaming at different bit-rates; wherein the files can be used for Adaptive Bit-Rate (ABR) streaming of the content over a network.

It is another object of the present invention to disclose the method mentioned above, wherein the timeline-node [140] data further comprises: a content identification key used for comparison with the searched fragment, a pointer to a similar fragment encoded for a higher available bit-rate [120], and a pointer to a similar fragment encoded for a lower available bit-rate [120], thereby facilitating ABR streaming of the file in a network with dynamically changing bandwidth and bit-rate conditions.

It is another object of the present invention to disclose the method mentioned above, the method comprising steps of facilitating an external entity [500] to select and provide the files [110] and/or file fragments [120] to be cached by the system [100].

BRIEF DESCRIPTION OF THE DRAWINGS

The invention is herein described, by way of example only, with reference to the accompanying drawings, wherein:

FIG. 4 is a schematic diagram showing the listed time-line fragments of a file;

FIG. 5 is a schematic diagram showing a listed storing hierarchy;

DETAILED DESCRIPTION OF PREFERRED EMBODIMENTS

Figure 1:
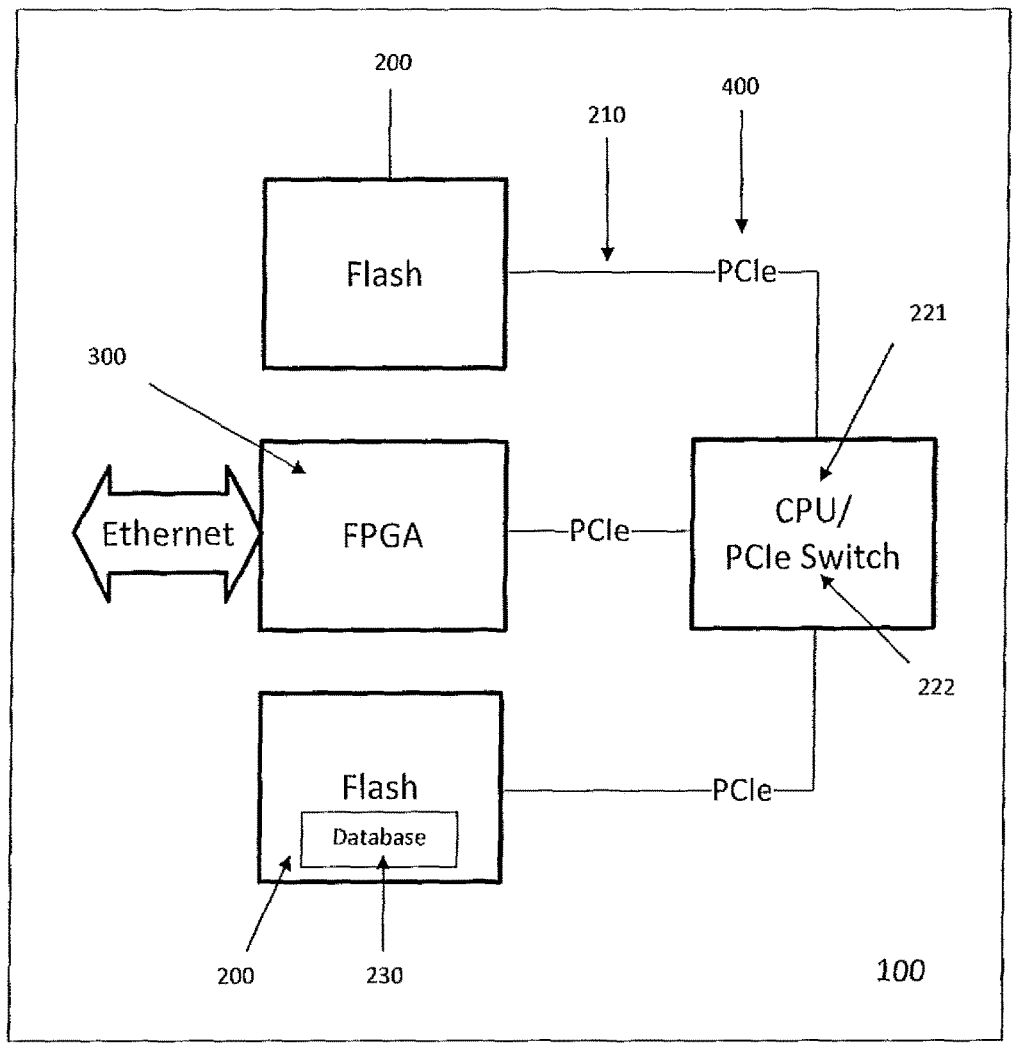
FIG. 1 is a schematic diagram showing the high level architecture of an embodiment of the system.

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a caching system based on hardware accelerator implemented for example by using integrated circuits like FPGA and/or ASIC and PCIe connected NAND flash cards.

The term "Storage Element," used herein, refers to a volume of non-volatile digital memory.

The terms "Cache" and Caching", used herein, refer to a method of storing internet content and delivering it from the operator's network, rather than always retrieving it from the remote source. The operator benefits through reduced bandwidth consumption, and the content owner and subscriber benefit through better quality of service and/or experience.

The term "Field-Programmable Gate Array (FPGA)", used herein, refers to an integrated circuit designed to be configured by a customer or a designer after manufacturing, hence field programmable. One of the FPGA's configurations is, for example, using a Hardware Description Language (HDL).

The term "Application-Specific Integrated Circuit (ASIC)", used herein, refers to an integrated circuit (IC) customized for a particular use, rather than intended for general-purpose use.

The term "NAND flash", used herein, refers to a type of non-volatile storage technology that does not require power to retain data. NAND flash memory cards are characterized by a reduced cost per bit and increased maximum chip capacity, so that they can compete with magnetic storage devices like hard disks. NAND flash memory cards are mostly used for devices having large files which are frequently uploaded and replaced.

The term "Peripheral Component Interconnect (PCI)", used herein, refers to a local computer bus for attaching hardware devices in a computer.

The term "Peripheral Component Interconnect Express (PCIe)", used herein, refers to high-speed serial computer expansion bus standard designed to replace the older PCI. PCIe has numerous improvements over the aforementioned bus standards, including higher maximum system bus throughput, lower I/O pin count and smaller physical footprint, better performance-scaling for bus devices, a more detailed error detection and reporting mechanism (Advanced Error Reporting, AER), and native hot-plug functionality. More recent revisions of the PCIe standard support hardware I/O virtualization.

The term "Ethernet", used herein, refers to a family of computer networking technologies for Local Area Networks (LANs). Systems communicating over the Ethernet divide a stream of data into shorter pieces called frames. Each frame contains source and destination addresses and error-checking data so that damaged data can be detected and retransmitted.

The term "Peer-to-Peer (P2P)" communication, used herein, refers to a type of decentralized and distributed communication which individual nodes in the network (called "peers") act both as suppliers and as consumers of resources, in contrast to the centralized client-server model where client nodes request access to resources provided by central servers.

The term "Transmission Control Protocol (TCP)", used herein, refers to one of the core protocols of the Internet protocol suite (IP). TCP provides reliable, ordered, error-checked delivery of a stream of octets between programs running on computers connected to a local area network, intranet or the public Internet. It resides at the transport layer. Web browsers use TCP when they connect to servers on the World Wide Web, and it is used to deliver email and transfer files from one location to another. HTTP, HTTPS, SMTP, POP3, IMAP, SSH, FTP, Telnet and a variety of other protocols are typically encapsulated in TCP.

The term "Transparent Cache," used herein, refers to a memory cache system in which a system operator caches downloaded data, according to specific criteria and strategies, in such a way that the end-user is unaware of the caching process.

The present invention provides a system [100] configured for the caching of files [110] streaming from at least one source-server to at least one end-user via the internet; characterized by at least one integrated circuit (IC) [300], configured to manage and direct files [110] or file fragments [120] to be cached in at least one storage-element [200], the ICs and storage elements interconnected by at least one high speed bus [210];

further wherein the storage elements [200] comprise different types of non-volatile memory, each type characterized by its memory access speed range;

further wherein a predetermined protocol resides in at least one storage element [200] and implements the selection of files [110] and file fragments [120] for caching;

further wherein the system [100] comprises at least one database [230] that maintains data on each cached file [110] or file fragment [120], the data a group of variables comprising: the caching status of files [110] and file fragments [120], data format characteristics of the files [110] and file fragments [120], and relative end-user demand for the files [110] and file fragments [120];

further wherein a predetermined protocol resides in at least one storage element [200] and continuously allocates or reallocates memory for the caching of the files [110] and file fragments [120] from among the storage elements [200]; the protocol allocating the memory as a function of the data maintained in the database [230] and respective amounts of the memory available in the storage elements [200].

According to a preferred embodiment of the present invention, the IC [300] is selected from a group consisting of: Field-Programmable Gate Array (FPGA), hybrid CPU/

FPGA [900], application-specific integrated circuit (ASIC), multi core processor, and any combination thereof.

According to another embodiment of the present invention, communication between the IC [300] and the at least one storage-element [200], is implemented by at least one Peripheral Component Interconnect Express (PCIe) bus [400].

According to another embodiment of the present invention, communication between the IC [300] and the at least one storage-element [200] is directed according to the IC [300] instruction via at least one CPU [221] and/or at least one PCIe switch [222].

According to another embodiment of the present invention, the IC [300] configured for segmentation of at least one of the files [110] at least two autonomous fragments [120] and wherein the IC [300] configured instruct caching the at least two fragments [120] in at least one of the at least one storage element [200].

According to another embodiment of the present invention, the at least one storage-element [200] is selected from a group consisting of: embedded registers, on-board Nand-flash, PCIe NAND flash card, on-chip flip-flop, embedded SRAM, on-board SRAM, on-board DRAM, external DRAM, solid state drives (SSDs), hard disk drives (HDDs), external storage and any combination thereof.

According to another embodiment of the present invention, the system comprising at least two the storage-elements [200] and wherein the IC [300] configured for real-time selection and storing of the files [110] and/or file fragments [120] in at least one of at least two storage-elements [200] for caching.

According to a preferred embodiment of the present invention, the IC [300] is configured to:
a. search for said files [110] and/or file fragments [120] in real time within said at least one storage-element [200];
in the event said files [110] and/or file fragments [120] are found in said at least one storage-element [200], said IC [300] is configured to:
i. retrieve said files [110] and/or file fragments [120] from said at least one storage-element [200]; and
ii. terminate the downloading of said files [110] and/or file fragments [120] from said source-server;
otherwise, said IC [300] is configured to:
i. select at least one said storage-element [200]; and
ii. download said files [110] and/or file fragments [120] from said source-server and cache said files [110] and/or file fragments [120] in the selected storage-element [200];
thereby controlling said caching of said files [110] and/or file fragments [120] in said at least one storage-element [200]; and
b. forward said files [100] and/or file fragments [120] towards the end-user.

According to another embodiment of the present invention, the format of the files [110] and/or file fragments [120] to be cached is verified.

According to another embodiment of the present invention, the real-time selection is according to at least one feature selected from a group consisting of: speed of the at least storage-element [200], bit cost of the storage-element [200], activity rate of the file of the fragments [120], compression methods of the file [110] or the fragment [120] and any combination thereof.

According to another embodiment of the present invention, the IC [300] configured for high speed Ethernet link.

According to another embodiment of the present invention, the IC [300] is configured for inspecting and classifying said files [110] by means of Deep Packet Inspection (DPI) of the streaming traffic.

According to another embodiment of the present invention, the IC [300] configured to search whether the files [110] and/or file fragments [120] are stored in at least one storage-element [200], and further configured, in the event that the files [110] and/or file fragments [120] are found on at least one local storage element, to terminate the streaming from the source-server and download the files [110] or fragments [120] from the local storage-element [200] towards the end-user.

According to another embodiment of the present invention, the at least one storage-element [200] is linked to at least one database [230], configured to identify and track the files [110] and/or file fragments [120].

According to another embodiment of the present invention, the IC [300] configured to manage at least one database [230].

According to another embodiment of the present invention, the IC [300] configured to construct at least one timeline-list [240] for the at least two fragments [120], listed in the at least one database [230].

According to another embodiment of the present invention, each of the fragments [120] is associated with a different timeline-node [140]; each of the timeline-nodes [140] comprises data for: next the timeline-node [140] pointer or head of the timeline-list [240], previous the timeline-node [140] pointer, location of its associated the fragment [120] and size of its associated the fragment [120]; the timeline-nodes [140] are listed according to timeline of their associated the fragments [120].

According to another embodiment of the present invention, the IC [300] configured to construct and update at least one activity-rate list [250] for the at least two fragments [120], listed in at least one of the at least one database [230].

According to another embodiment of the present invention, each of the fragments [120] is associated with a different activity-node [150]; each of the activity-nodes [150] comprises data for: next the activity-node [150] pointer or head of the activity-rate list [250], previous the activity-node [150] pointer, and pointer to its associated the fragment [120].

According to another embodiment of the present invention, the IC [300] is configured to rank the speed levels of the at least two storage-elements [200], store the fragments [120] according to their the activity rate, by means of most active fragment stored in highest ranked storage-element, and list their associated the activity-rate list [250] accordingly.

According to another embodiment of the present invention, IC [300] configured to migrate at least one of the fragments [120] from one of the at least two storage-elements [200] to another, according to updated availability of the at least two storage-elements [200] and according to updated activity-rate list [250].

According to another embodiment of the present invention, the streaming files [110] are selected from a group consisting of: video-film, on-line gaming, web application, website, navigation tool application, tracking tool application, and any combination thereof.

The above proposed method and system are related to caching of video streamed over HTTP and transmitted using a peer-to-peer protocol, such as but not limited to Torrent™. In either protocol, the cache reconstructs the video data by defragmenting the transmitted packets which pass through.

The advantage of using the above method, compared to prior art, is a significant in processing and transfer speeds. ASIC and FPGA are capable of processing data in rates of 100 Gbps and even 400 Gbps comparing to solutions based on sequential SW implemented on a CPU (such as Intel Xeon) which is capable of processing up to 10 Gbps at the most.

The use of PCIe as a bus connecting the processing unit (FPGA in the proposed method) provides storage access rate which outperforms the interfaces used in prior art. PCIe is designed for exchanging data in rates of 4 Gbps in PCIe Gen. 2 and 8 Gbps in PCIe Gen. 3 per lane and the can be scaled up by pairing numerous lanes together. For example, there are available PCIe Flash cards which provide access rate of up to 24 Gbps comparing to traditional storage interfaces, such as SATA, which provides 6 Gbps per lane with no pairing option.

The use of PCIe as FPGA to Flash cards interconnect provides a means to connect the processing unit (FPGA) to numerous storage cards in a standard server with no need to alter it and still gain superior performance over existing solutions.

The present invention discloses a caching system for streaming content files. The system comprises at least one IC such as FPGA or ASIC connected to an array of NAND flash components via at least one high speed bus, such as PCIe.

The FPGA and/or ASIC are configured for at least one of:
High speed Ethernet link with external equipment;
Traffic inspection, by means of a DPI (deep packet inspection) function to identify the traffic classification;
Storing the relevant content in the storage components (DRAM, Flash);
Searching if a new content is already locally stored;
Hold and manage all databases which are required for maintaining the cache; and
In case of a cache hit: transmitting the stored content and terminating the transmission from the source server.

Reference is now made to FIG. 1, which describes the high level architecture of the system [100]. The IC [300] (FPGA and/or ASIC) is linked to any external Ethernet equipment on one side and to an array of NAND Flash memory components [200] on the other side. In this example the connection is over a PCIe bus [400], via either a PCIe switch [222] or via a CPU [2221] using the PCIe [400] peer-to-peer communication.

The media file is analyzed by the IC [300] (FPGA and/or ASIC) with the aid if internal or external CPU and is segmented to independent fragments. Each fragment can be for example description of MPEG group of pictures (GOP), which is a hold of the minimum information required for displaying video image. Each fragment is stored independently of other fragments of the same movie. This method provides means for accelerating the cache performances including: faster storing, searching comparing and retrieving of the stored the entire file as is.

The deconstruction of the video file [110] in to fragments [120] is performed by either the FPGA and/or the ASIC or by a coexisting or external CPU. The media can also be originally streamed as a collection of fragments.

Figure 2:
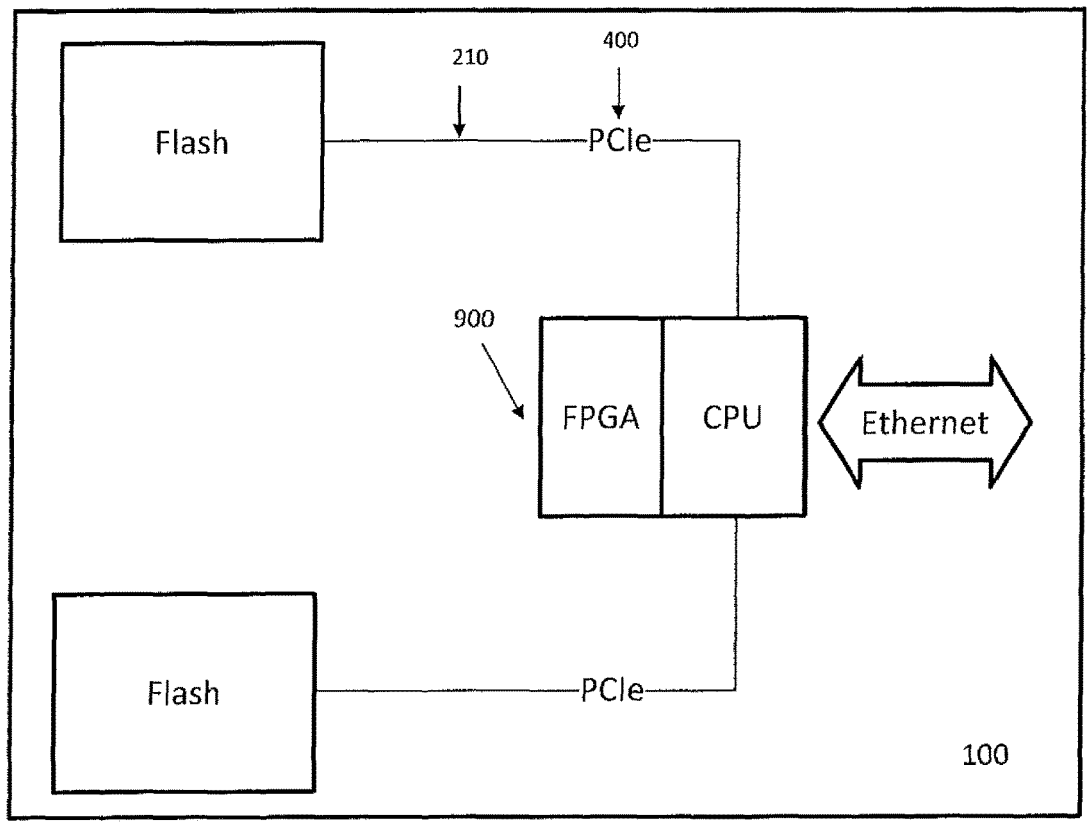
FIG. 2 is a schematic diagram describing the architecture of an embodiment of the system with a hybrid CPU/FPGA chip [900]

Reference is now made to FIG. 2. The system can be also constructed using a hybrid CPU/FPGA chip. In such an architecture, the hybrid chip is responsible for all of the computing and I/O access tasks which are required for caching the video. The demarcation of the functions between the CPU unit and the FPGA unit is the same as in a non-hybrid architecture.

Figure 3:
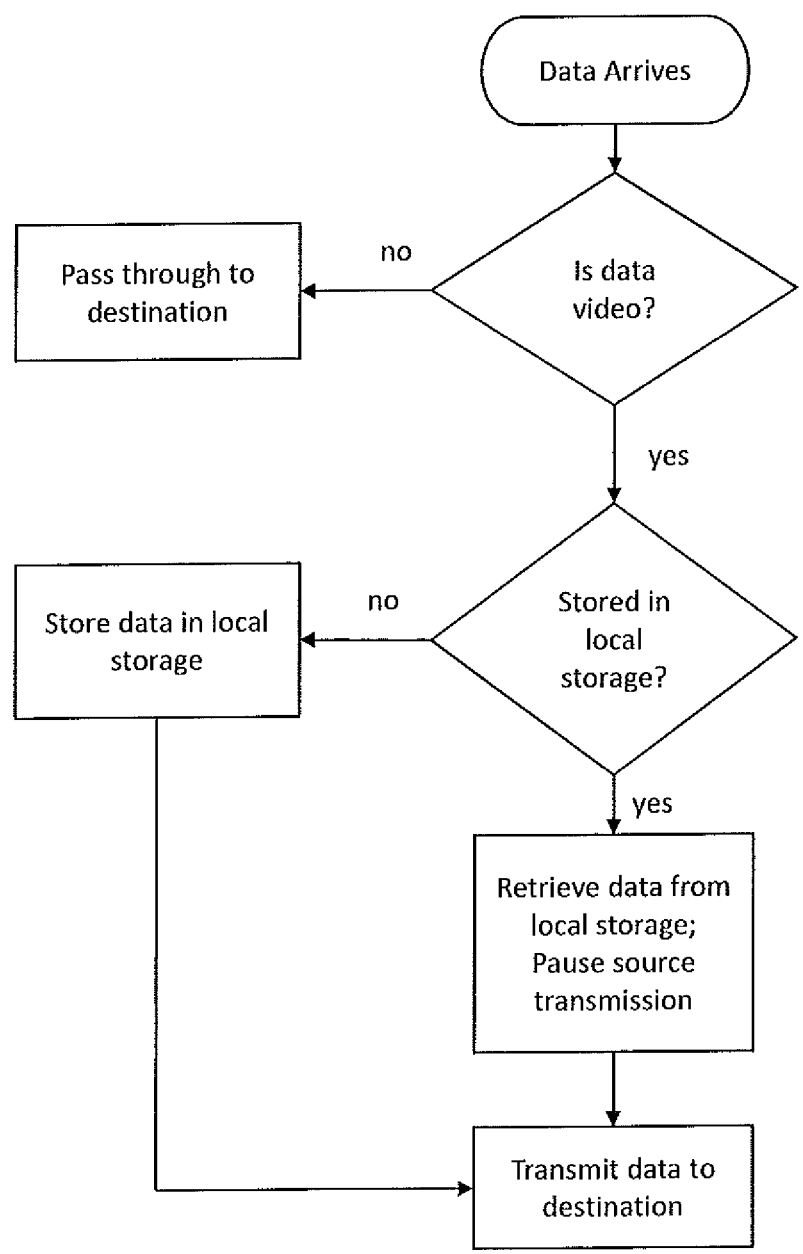
FIG. 3 is a schematic diagram demonstrating the caching method flow chart.

Reference is now made to FIG. 3, demonstrating a flow chart for the basic functionality of the system. When data (files) arrives or streams into the system [100], it is verified whether the data is a video file. After verifying, the system allows the data/video-file to be downloaded and further pass towards the end-user. Meanwhile a search begins to check whether this particular file was previously downloaded and cached before. If the file was previously cached, downloading from the source server is terminated and the cached file [100] is sent towards the end-user, otherwise, the file is being cached for future use in at least one of the local storage elements [200].

Multiple Memory-Type Hierarchy of Video Data Storage

The system includes several levels of memory storage components, each level reflecting access speed and cost. Faster memory is usually more expensive. The system will comprise a relatively smaller volume of faster storage elements and a relatively larger volume of slower storage elements What follows is an example of a ranked list of storage element types, from the highest-ranked (1), fastest, and costliest to the lowest-ranked (9), slowest, and cheapest.
1. Embedded registers
2. Embedded SRAM
3. On board SRAM
4. On board DRAM
5. On board NAND Flash
6. PCIe NAND flash card
7. SSD (solid state drive)
8. HDD (hard disk drive)
9. External storage According to an embodiment of the present invention, the system stores each video file fragment (or the entire track/file) in a type or level of memory element according to the level of demand for that video (or fragment) and predicted future demand for that data. The most requested (active) video data will be stored in higher ranked memory level (the fastest) and less requested (less active) video data will be stored in the lower ranked memory level (the slowest).

According to an embodiment of the present invention, the video fragments migrate from one level of memory to the other dynamically and without interference to the coherency of the data or to the functional operation of the cache.

According to an embodiment of the present invention, video tracks are divided to autonomous fragments or segments. Each fragment could be for example a Group of Pictures (GOP) composed of I/P/B frames. Each fragment could be stored in a different memory level.

According to an embodiment of the present invention, a linked list data structure is constructed to manage the location of the fragment. Each node or timeline-node [140] in the linked timeline-list [240] holds a description of one fragment. The list stores the fragments according to place of the fragment in the media track (timeline). The timeline-node [140] of the first displayed fragment is the head of the list. The rest of the timeline-nodes [140] are sorted in the order of fragments' sequence of presentation.

Reference is now made to FIG. 4, describing a dual linked list of the fragments descriptors. Each descriptor has the following attributes:
a pointer to the previous timeline-node [140] in the list;
the location of the fragment data, by means of memory level and address;
the size of the fragment data in bytes; and
a pointer to the next timeline-node [140] in the list.

According to another embodiment of the present invention, at least one activity list [250] is constructed according to the activity rate of each fragment, where the most active fragment is stored at the head of the list. According to another embodiment of the present invention the activity lists are stored in order according to their ranked storage elements [200].

The most active fragments of one memory level will migrate to a higher (faster) level of memory, if space enables. The first step of the migration process will be to read the fragment from the source memory and write it to the target memory. Only when the fragment is stored in the target memory will that fragment descriptor be modified to point to the new location. This process assures that the fragment is available for retrieval at all times, with no interference to the cache system.

According to an embodiment of the present invention, each time that a fragment is required, the activity descriptor pointing to it will move to the head of the relevant activity list, though the least required media fragment will eventually move to the tail of the list. When a memory level [200] is filled, new fragments will take the place of a fragment from the tail of the activity list.

An advantage of the above mentioned method is that a video file doesn't have to be fully copied from one memory layer to the other. The process can be done gradually and fast with no functional interference.

In addition to migration of the fragments detected as required, other fragments which are predicted to be required are also migrated. For example once a certain fragment of video is required, it can be predicted that the following chronological fragments will be required as well. Since the fragments are linked by chronological order they can be easily located and copied to a better level of memory.

Reference is now made to FIG. 5 describing a dual linked fragments' activity-rate list [250]. Each descriptor has the following attributes:
    a pointer to the previous activity-node [150] in the list;
    a pointer to the fragment descriptor; and
    a pointer to the next activity-node [150] in the list.

Figure 6:
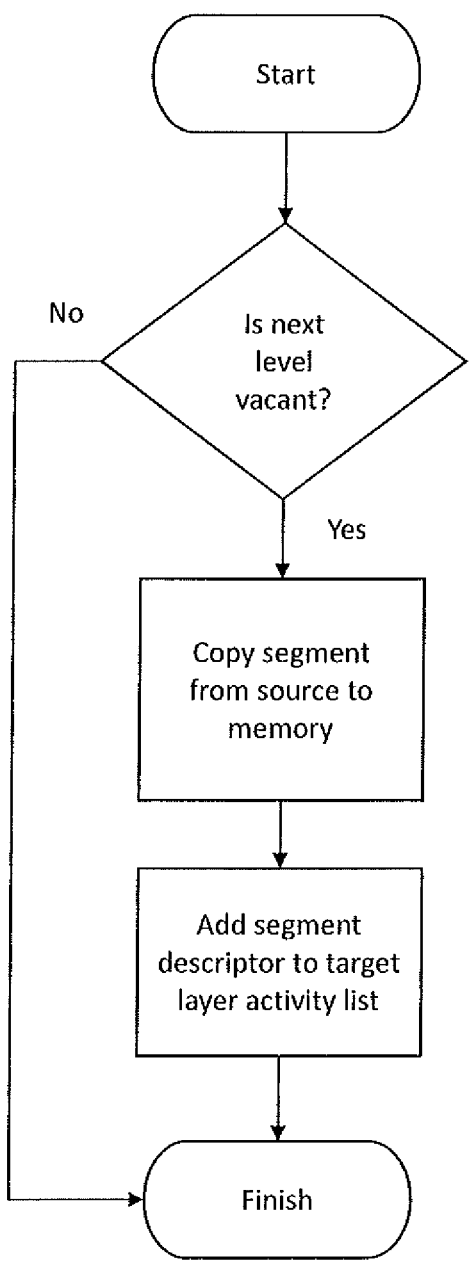
FIG. 6 is a schematic diagram demonstrating a method for fragments' migration according to their activity rate.

Reference is now made to FIG. 6, which depicts the process of migrating fragments from one storage element level to another according to the fragments' activity-rate. Availability of the storage-elements [200] is frequently monitored and the storage level for the most active fragments is upgraded as their data is transferred to higher ranked storage elements [200].

The invention can serve to implement caching methodologies of transparent and non-transparent caches.

According to an embodiment of the present invention, the invention described herein is implemented as a transparent cache system.

According to an embodiment of the present invention, the invention described herein is implemented as a non-transparent cache.

Fast Allocation of Stored Video Fragment, Based on History of the Session

Video streaming and downloading is done over a Transmission Control Protocol (TCP) session. Before commencing data transmission a TCP connection is established between the client and server and another connection is established from server and client.

HTTP-GET-requests, for video file segments, are sent from a client, which can be an internet browsing engine or a video streaming tool, to the server over the client-server TCP connection and the file fragments are transmitted back over the server-client connection.

A single TCP connection is defined by the following four tuples:

1. SIP: source IP address
2. DIP: destination IP address
3. SPN: source port number
4. DPN: destination port number Each IP packet which is transmitted over the TCP link will have the same four tuples mentioned above.

The above mentioned four tuples are used to speed up the look-up of a new fragment in the cache database. Once a video track is transmitted over a certain TCP session, it will be marked as linked to that session. Each time that video fragment is found to be transmitted over the marked session, the first lookup search for a match in the cache database will concentrate on the track linked to that session.

A table will be stored with the following attributes:
    Session ID:
        Either four tuples: {SIP, DIP, SPN, DPN}
        Or only two tuples: {SIP, DIP}
    Track ID
    Pointer to descriptor to the following fragment to be transmitted According to an embodiment of the present invention, the IC [300] is further configured to construct and update at least one pointing-entry [270] to the timeline-node [140] associated with the next file fragment [120] to be transmitted towards the end-user, according to said timeline list [240].

According to another embodiment of the present invention, the pointing-entry [270] data comprises: a file ID value for the fragment's [120] file, a pointer to the timeline-node [140], the file's source-server IP address (SIP), the end-user's IP address (DIP), the source-server's port number (SPN), and the end-user's port number (DPN).

According to another embodiment of the present invention, the pointing-entry [270] data comprises: the file ID, a pointer to said timeline-node [140], the file's source-server IP address (SIP), and the end-user's IP address (DIP).

Figure 7:
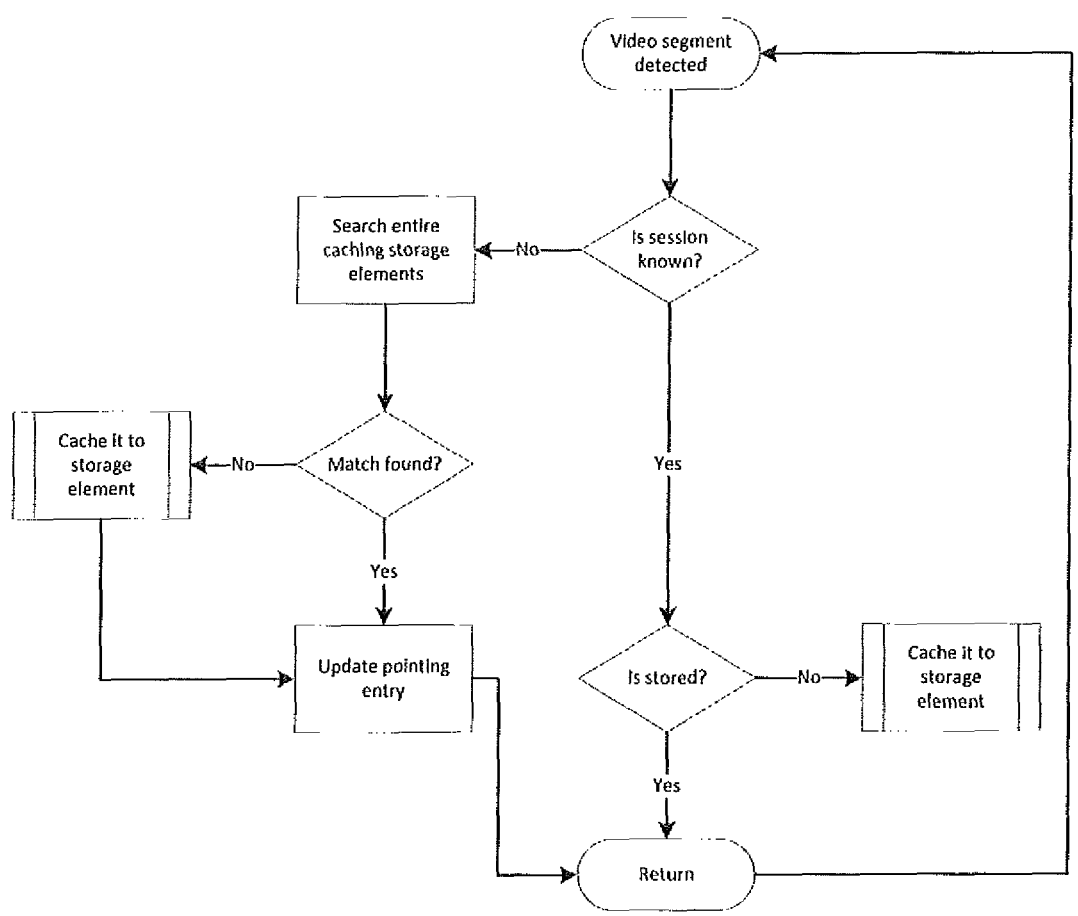
FIG. 7 is a schematic diagram demonstrating another embodiment for the caching method.

Reference is now made to FIG. 7, which illustrates the pointing process. Each time video is detected passing through the cache, the above table will be searched. If the session is already linked to a certain video track, the stored attributes will be used to rapidly allocate the next fragment to be transmitted. If not, the session will be marked as linked to the new or detected track.

Fast Allocation of Alternative Bit-Rate Track

Adaptive Bit-Rate (ABR) is a method for streaming continuous video in changing conditions of connection. The condition of the connection from source to the client is unpredicted and may change over time; on the other hand in order to impact the QoE (Quality of Experience) as less as possible, it is very important to keep continuous display of video image.

In ABR each video track is encoded in more than one level of compression and quality. Better image quality requires higher bit-rate and better connection for streaming. according to an embodiment of the present invention, during streaming, the client, which can be an internet browser or video streamer, selects which of the files, which have same content but are different quality, will be streamed according to the connection status or condition. The best quality that the transmission conditions permit will be chosen and sent towards the end-user. The switching from one file to the other is done dynamically and in real-time. The switching does not affect the continuous display of the video image.

Examples for ABR are:
    MPEG DASH;
    Adobe Dynamic Streaming for Flash;
    Apple HTTP live streaming; and
    Microsoft smooth streaming.

According to an embodiment of the present invention, the above mentioned method provides acceleration for allocation of the required video fragments in the cache storage, when multiple bit-rates exist. The multiple presentations of the same track are stored and linked to each other. The next fragment to be delivered can be searched either in the link list representing the same bit-rate or in the one representing a higher or a lower bit-rate. Such that when the bit-rate is switched, allocation of the next fragment is immediate and the cache immediately reacts and sends the required video data.

Another advantage of the above mentioned method is the option to improve the video quality that would have been transmitted without the cache and the option to improve quality during the actual streaming process. Once a certain video track is detected as transmitted to a client, the cache will transmit the best quality representation stored locally. The client will enjoy better QoE not available without using this method.

According to an embodiment of the present invention, the system is configured to cache at least two said files [110] having similar content and respectively encoded for streaming at different bit-rates; wherein said files can be used for Adaptive Bit-Rate (ABR) streaming of said content over a network.

According to another embodiment of the present invention, the timeline-node [140] data further comprises: a content identification key used for comparison with the searched fragment, a pointer to a similar fragment encoded for a higher available bit-rate [120], and a pointer to a similar fragment encoded for a lower available bit-rate [120], thereby ABR streaming of said file is facilitated in a network with dynamically changing bandwidth and bit-rate conditions.

Figure 8:
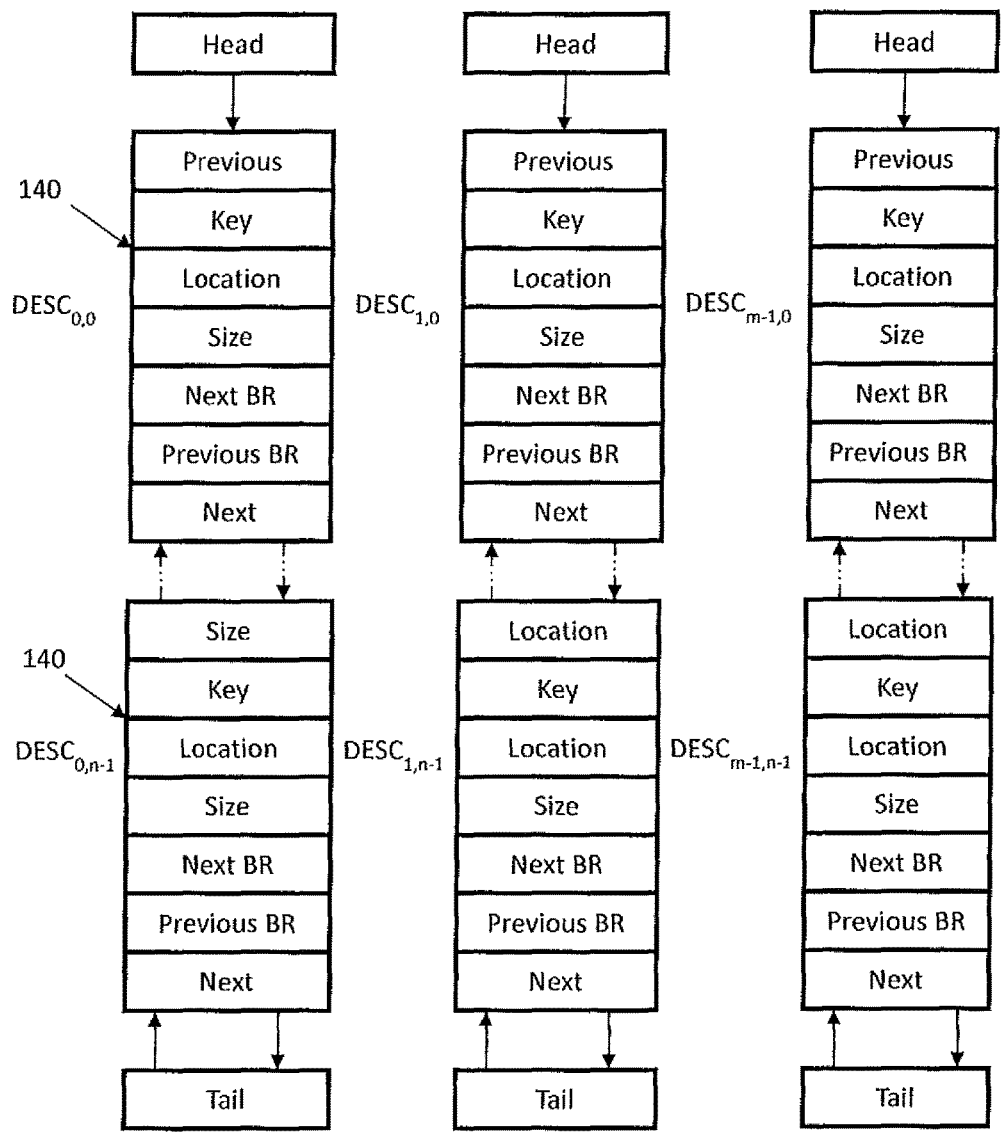
FIG. 8 is a schematic diagram showing an embodiment for listed time-line fragments with alternate bit-rates.

Reference is now made to FIG. 8, which describes a data structure used for linking more than one video track presentation in a way which permits fast allocation and switching from one presentation to the other. Each timeline-node [140] in the linked list describes attributes of a certain video fragment [120], and each fragment is linked to a fragment with the same presentation time but with different bit-rate. The attributes of each timeline-node [140] are:
  a pointer to the previous timeline-node [140] in the list
  a key used for comparison with searched fragment
  the location of the segment data: memory level and address
  the size of the segment data in bytes
  a pointer to the higher available bit-rate same content fragment
  a pointer to the lower available bit-rate same content fragment
  a pointer to the next timeline-node [140] in the list Per each session a pointer to the last required fragment is kept (as described above) the next fragment can be is available and easily located from several available bit-rates using the purposed data structure. Such that, allocation of the required fragment is immediate, even when bit-rate is switched.

Once a fragment [120] is searched and located, the system can decide to send a higher quality version of the desired segment of video, if the higher quality version is stored locally. This way the client enjoys better QoE then available without using this method.

Live Video Caching

The system and method described herein can be also used for the caching of live video transmission.

Live video transmission is characterized by the requirement for low processing delay and by the fact that the caching should be almost instant. The cache database cannot be constructed in advance as it is with the streaming of non-live video on demand (VOD).

As with VOD, live streaming video is also distributed over HTTP, and unicast to each user consuming the same program, thereby creating an additional connection session to the origin server and adding more bandwidth demand to the transport network.

The described system and method can instantly recognize that a video content has very recently (with almost no delay) been consumed by another client. It can therefore optimize the caching system to provide the live video transmission data to additional users more quickly. The system will thus reduce the required transport network bandwidth to a minimum, in the best case equivalent to the bandwidth required of a single live program stream.

Managed Cache

In a managed cache, an external managing entity provides the content to be cached and instructs the system to cache the content.

A managed cache application doesn't require the system to recognize which video files should be cached. It is required, as in a non-managed cache, to retrieve the right video file from the database storage and to transmit it to the requesting client.

The advantage of the proposed solution over existing solutions is the ability to support superior caching performance and consume less space and power to do so.

According to an embodiment of the present invention, the system [100] is configured to facilitate an external entity [500] to select and provide the files [110] and/or file fragments [120] to be cached by the system [100].

EXAMPLES

The following examples are used to further illustrate embodiment claimed in the present invention. The examples describe the manner and process of the present invention and set forth modes contemplated by the inventors for carrying out the invention, but are not to be construed as limiting the invention.

Example 1: Video on Demand (VOD) for an Internet Service Provider

The system and method described herein can be used by an Internet Service Provider as a way to provide better Quality of Experience (QoE) for its users who consume Video on Demand (VOD) content, especially when the resolution quality of that content can be optimized for High Definition with an Alternate Bit Rate (ABR) strategy. In such a situation, more users will be able to enjoy higher definition video and higher quality audio because the content in such formats will be more readily available.

Example 2: Live Video Caching

The system and method described herein can be also used for the caching of live video transmission. Live video streaming is the process whereby video content is made available for download in real time. This mode of video provision is contrasted to video-on-demand (VOD), whereby the content is available for download at any time.

Live video streaming is most commonly used for providing near instantaneous delivery of video content of an event occurring in real time.

Live video transmission is characterized by the requirement for low processing delay and by the fact that the caching should be almost instant. The cache database cannot be constructed in advance as it is with the streaming of non-live video on demand (VOD).

As with VOD, live streaming video is also distributed over HTTP, and unicast to each user consuming the same program, thereby creating an additional connection session to the origin server and adding more bandwidth demand to the transport network.

The described system and method can instantly recognize that a video content has very recently (with almost no delay) been consumed by another client. It can therefore optimize the caching system to provide the live video transmission data to additional users more quickly. The system will thus reduce the required transport network bandwidth to a minimum, in the best case equivalent to the bandwidth required of a single live program stream.

The invention claimed is:

1. A system configured for caching of files streaming from at least one source-server to at least one end-user via the internet;
 a. characterized by at least one integrated circuit (IC), configured to manage and direct file fragments of said files, to be cached in at least one storage-element, said ICs and storage elements interconnected by at least one high speed bus;
 b. further wherein said storage elements comprise different types of non-volatile memory, said each type characterized by its memory access speed range;
 c. further wherein a predetermined protocol resides in at least one said storage element and implements a selection of file fragments for caching;
 d. further wherein said system comprises at least one database that maintains data on each cached file fragment, said data a group of variables, a variable comprising: a caching status of a cached file fragment, data format characteristics of said cached file fragment, and relative end-user demand for said cached file fragment;
 e. further wherein a predetermined protocol resides in at least one said storage element and continuously allocates or reallocates memory for the caching of each of said file fragments from among said storage elements; said protocol allocating said memory as a function of said data maintained in said at least one database and respective amounts of said memory available in said storage elements;
 f. further wherein at least one storage-element is linked to said at least one database, wherein said at least one database is further configured to identify and track said file fragments;
 g. further wherein said IC [300] is configured to manage said at least one database;
 h. further wherein said IC is configured to:
  i. construct at least one timeline-list for at least two of said file fragments; and
  ii. store said timeline-list in said at least one database;
 i. further wherein
  i. each said file fragment is associated with a timeline-node of data comprising:
   1) a pointer to the next timeline-node or to the head of said timeline-list,
   2) a pointer to the previous timeline-node,
   3) a pointer to the location of said file fragment; and
   4) the size of said file fragment; and
  ii. timeline-nodes are listed on said timeline-list according to the timeline sequence of their associated file fragments;
 j. further wherein timeline-node data further comprises: a content identification key used for comparison with the searched fragment, a pointer to a similar fragment encoded for a higher available bit-rate, and a pointer to a similar fragment encoded for a lower available bit-rate, thereby ABR streaming of said file is facilitated in a network with dynamically changing bandwidth and bit-rate conditions; and
 k. further wherein said content identification key is based on unique content of said searched fragment.

2. The system according to claim 1, wherein communication between said IC and said at least one storage-element, is implemented by at least one Peripheral Component Interconnect Express (PCIe) bus.

3. The system according to claim 1, wherein said IC is configured to:
 a. search for said file fragments in real time within said at least one storage-element;
 in the event said file fragments are found in said at least one storage-element, said IC is configured to:
  i. retrieve said file fragments from said at least one storage-element; and
  ii. terminate the downloading of said file fragments from said source-server;
 otherwise, said IC is configured to:
  i. select at least one said storage-element; and
  ii. download said file fragments from said source-server and cache said fragments in the selected storage-element;
 thereby controlling said caching of said file fragments in said at least one storage-element; and
 b. forward said file fragments towards the end-user.

4. The system according to claim 1, wherein said IC is configured to:
 a. construct an activity-rate list for said at least two file fragments; and
 b. store said activity-rate list in said at least one database.

5. The system according to claim 4, wherein each of said fragments is associated with a different activity-node of data comprising:
 a. a pointer to the next activity-node or to the head of said activity-rate list,
 b. a pointer to the previous activity-node, and
 c. a pointer to the location of said file fragment.

6. The system according to claim 5, wherein said IC is configured to
 a. rank said at least two storage-elements according to their access speed levels;
 b. store said file fragments according to their relative activity rates, with the most active fragment stored in the highest ranked storage-element; and
 c. list the activity-nodes of said file fragments in said activity-rate list accordingly.

7. The system according to claim 5, wherein said IC is configured to migrate at least one of said fragments from one of at least two storage-elements to another, said migration a function of:
 a. updated changes in the available memory in said storage-elements and
 b. updated changes in said activity-rate list.

8. The system according to claim 1, wherein said IC is further configured to construct and update a table containing at least one pointing-entry to the timeline-node associated with the next file fragment to be transmitted to said end-user, according to said timeline list.

9. The system according to claim 8, wherein said pointing-entry data comprises: a file ID value for the fragment's file, a pointer to said timeline-node, and session identifier including the file's source-server IP address (SIP) and the end-user's IP address (DIP).

10. The system according to claim 9, wherein said session identifier further comprises: the source-server's port number (SPN), and the end-user's port number (DPN).

11. A method for caching of files streaming from at least one source-server to at least one end-user via the internet, the method comprising steps of providing at least one integrated circuit (IC), configured to manage and direct said file fragments to be cached in at least one provided storage-element, said ICs and storage elements interconnected by at least one provided high speed bus;
   a. the method further comprising steps of providing said storage elements having different types of non-volatile memory, said each type characterized by its memory access speed range;
   b. the method further comprising steps of selecting file fragments for caching according to a predetermined protocol residing in at least one said storage element;
   c. the method further comprising steps of providing at least one database that maintains data on each cached file fragment, said data a group of variables comprising: a caching status of file fragments, data format characteristics of said file fragments, and relative end-user demand for said file fragments;
   d. the method further comprising steps of continuously allocating or reallocating memory for the caching of each of said file fragments from among said storage elements according to a predetermined protocol residing in at least one said storage element; said protocol allocating said memory as a function of said data maintained in said at least one database and respective amounts of said memory available in said storage elements;
   e. the method further comprising steps of providing at least one storage element linked to said at least one database, wherein said at least one database is further configured for identifying and tracking said file fragments;
   f. the method further comprising steps of configuring said IC for managing said at least one database;
   g. the method further comprising steps of:
      a. constructing at least one timeline-list for said at least two file fragments; and
      b. storing said timeline-list in said at least one database;
   h. the method further comprising steps of:
      a. associating each said file fragment with a timeline-node of data comprising:
         i. a pointer to the next timeline-node or to the head of said timeline-list,
         ii. a pointer to the previous timeline-node,
         iii. a pointer to the location of said file fragment, and
         iv. the size of said file fragment; and
      b. listing said timeline-nodes on said timeline-list according to the timeline sequence of their associated file fragments;
   i. the method further comprising steps of caching at least two said files having similar content and respectively encoded for streaming at different bit-rates; wherein said files can be used for Adaptive Bit-Rate (ABR) streaming of said content over a network;
   j. wherein said timeline-node data further comprises: a content identification key used for comparison with the searched fragment, a pointer to a similar fragment encoded for a higher available bit-rate, and a pointer to a similar fragment encoded for a lower available bit-rate, thereby facilitating ABR streaming of said file in a network with dynamically changing bandwidth and bit-rate conditions; and
   k. further wherein said content identification key is based on unique content of said searched fragment.

12. The method according to claim 11, further comprising steps of implementing communication between said IC and said at least one storage-element by means of at least one PCIe bus.

13. The method according to claim 11, further comprising steps of configuring said IC for:
   a. real-time searching for said file fragments within said at least one storage-element;
   in the event said file fragments are found in said at least one storage-element, said method comprises steps of:
      i. real-time retrieval of said file fragments from said at least one storage-element; and
      ii. real-time termination of the downloading of said file fragments from said source-server;
   otherwise, said method comprises steps of:
      i. selecting at least one of said at least one storage-element;
      ii. caching said file fragments in said at least one storage-element;
   thereby controlling said caching of said file fragments in said at least one storage-element; and
   b. forwarding said file fragments towards said end-user.

14. The method according to claim 11, further comprising steps of:
   a. constructing at least one activity-rate list for said at least two file fragments; and
   b. storing said activity-rate list in said at least one database.

15. The method according to claim 14, further comprising steps of associating each said file fragment with an activity-node of data comprising:
   a. a pointer to the next activity-node or to the head of said activity-rate list,
   b. a pointer to the previous activity-node, and
   c. a pointer to the location of said file fragment.

16. The method according to claim 15, further comprising steps of:
   a. ranking said at least two storage-elements in a hierarchy according to their access speed levels;
   b. storing said file fragments according to their relative activity rates, with the most active fragment stored in the highest ranked storage-element; and
   c. listing the activity-nodes of said file fragments in said activity-rate list accordingly.

17. The method according to claim 15, further comprising steps of migrating at least one of said fragments from one of at least two storage-elements to another, said migration a function of:
   a. updated changes in the available memory in said storage-elements and
   b. updated changes in said activity-rate list.

18. The method according to claim 11, further comprising steps of configuring said IC to construct and update at least one pointing-entry to the timeline-node associated with the next file fragment to be transmitted to said end-user, according to said timeline list.

19. The method according to claim 18, further comprising steps of configuring said pointing-entry data to comprise: a file ID value for the fragment's file, a pointer to said timeline-node, the file's source-server IP address (SIP), and the end-user's IP address (DIP).

20. The method according to claim 19, further comprising steps of configuring said pointing-entry data to comprise: the source-server's port number (SPN), and the end-user's port number (DPN).

* * * * *